United States Patent [19]
Martenhoff et al.

[11] Patent Number: 5,163,278
[45] Date of Patent: Nov. 17, 1992

[54] LAWN BAGGER

[76] Inventors: James E. Martenhoff, 29200 S. Jones Loop Rd., Box 367, Punta Gorda, Fla. 33950; Vincent Esposito, 479 Elmira Blvd., Port Charlotte, Fla. 33952

[21] Appl. No.: 747,960

[22] Filed: Aug. 21, 1991

[51] Int. Cl.⁵ ............................................. A01D 35/00
[52] U.S. Cl. ....................................... 56/473.5; 56/202
[58] Field of Search .................. 56/473.5, 1, 202, 203, 56/320.1, 320.2

[56] References Cited
U.S. PATENT DOCUMENTS

| | | | |
|---|---|---|---|
| 4,126,986 | 11/1978 | Kidd | 56/202 |
| 4,152,884 | 5/1979 | Gandrud et al. | 56/202 |
| 4,444,002 | 4/1984 | Heismann et al. | 56/202 |
| 4,702,063 | 10/1987 | Satoh et al. | 56/202 |
| 4,936,083 | 6/1990 | Deutsch | 56/202 |

*Primary Examiner*—Thuy M. Bui
*Attorney, Agent, or Firm*—Frank A. Lukasik

[57] ABSTRACT

The invention is a lawn and trash bagger comprising a rigid frame structure which provides an unobstructed opening or funnel into a bag which is held over the back end by a flexible cord having fastening hooks located at each of its ends. A handle is provided for lifting the lawn bagger each time the trash is emptied into the bag.

7 Claims, 1 Drawing Sheet

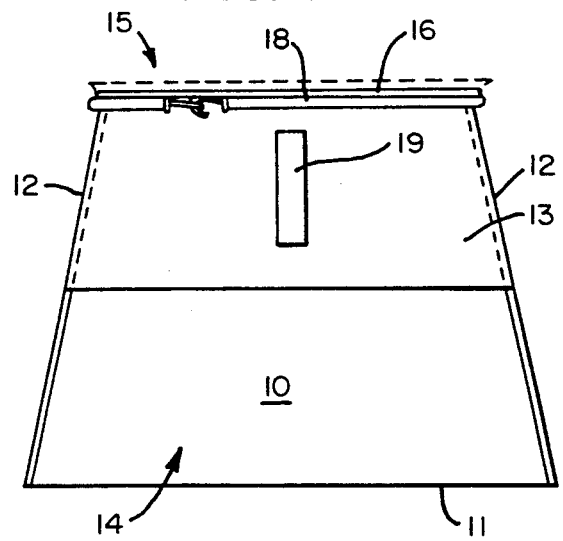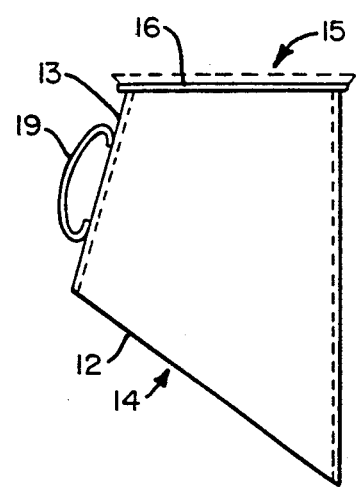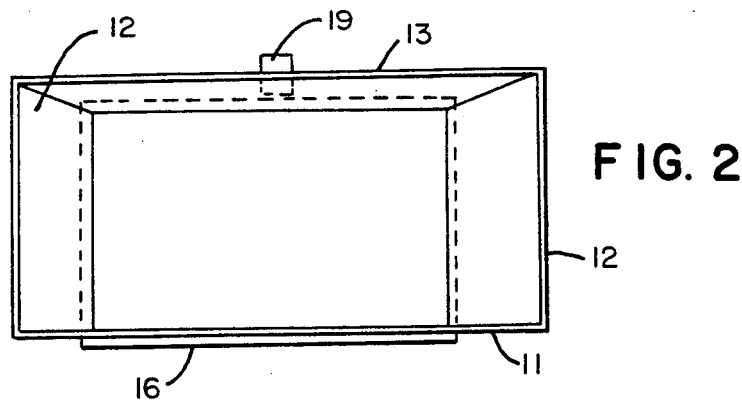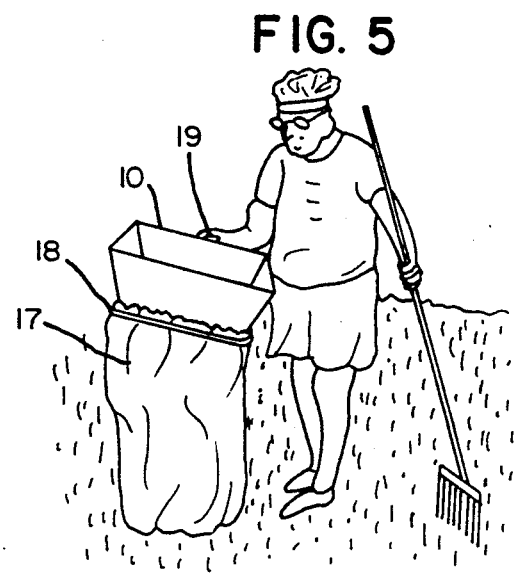

LAWN BAGGER

BACKGROUND OF THE INVENTION

1. Field of the invention

The invention relates generally to a novel collecting and bagging apparatus for leaves, trash and other debris as well as to a method for collecting such debris using the disclosed apparatus. More particularly, the present invention relates to such containers which employ conventional disposable trash bags, preferably biodegradable, and are intended for household application by the general consuming public.

2. Background of the Prior Art

Numerous devices have been developed and commercialized for the collection of trash, leaves and other refuse. These range from commercial units weighing hundreds of pounds and requiring special transport trucks to widely marketed inexpensive consumer oriented products. Refuse containers for non-commercial or household applications which are inexpensive and relatively easy to employ abound. Such prior art containers have a number of shortcomings. For example, U.S. Pat. No. 5,031,277 to Coker discloses trash and leaf bagging apparatus constructed of a rigid frame having an opening that is completely surrounded with a supply of netting material that forms a netting bag and is primarily designed for air-blowing the trash into the receptacle. In addition to being large, heavy and very likely expensive, air-blowing will not "blow" pine needles and certain other trash. Furthermore, the nature of the opening will not readily permit raking the trash because of its structure.

The devices described in U.S. Pat. Nos. 4,442,567 and 4,357,728 to Pravettone provide a frame for supporting and transporting a garbage collecting bag. The bag is attached to the top of the frame. The frame has a dustpan extending from one end and is designed so that refuse can be swept through the dustpan and into the bag when the device is placed in a horizontal position. When placed in an upright position, the bag rests on wheels which makes the device portable. The frame for the device in the two related patents is dimensionally adjustable.

In addition to the above, U.S. Pat. No. 1,234,057 to McIntyre discloses a combined scoop and sack filling device designed to hold the sack to be filled around the discharge spout of the scoop. U.S. Pat. No. 2,688,429 to Davison discloses a bag holder and filler which is adjustable to fit boxes or bags of substantially the same size opening but of variable height. U.S. Pat. No. 4,200,127 to Dunleavy discloses a central hole through it and an attachment means around the hole to which the blanket is secured. U.S. Pat. No. 4,240,474 to Perkins discloses a bag holder and collector for receiving grass clippings etc., in a top hopper for discharge into a collection bag mounted below the hopper. U.S. Pat. No. 4,273,167 to Stillwell discloses a trash bag holding stand that may be manually assembled without the use of tools to support a pliable bag in open, fillable position.

U.S. Pat. No. 4,521,043 to Wilsford discloses a trash bagging apparatus comprising two flat side sheets connected together by a hinge at their interior edges, their exterior edges free to be pivoted about the hinged connection for carrying or storage, or opened up to engage a flexible container for trash. U.S. Pat. No. 4,979,547 to Hoerner discloses an elongated sleeve made of a plurality of substantially rigid panels interconnected with one another in folding relationship. The sleeve is adapted to positively retain a collapsible bag at the top while the bag is being filled by filling the interior of the sleeve.

As shown above, any number of containers, collectors and transporters for refuse such as garbage, leaves, grass clippings and the like have been suggested and commercialized in the past. These range from commercial units weighing hundreds of pounds and requiring special transport trucks to widely marketed inexpensive consumer oriented products. The generally available commercial units typically prove to be unacceptable for household applications due to size and, more importantly, weight and cost considerations. Many containers which have received consumer acceptance attribute success only to mass marketing such as through television and newspaper advertising rather than through engineering and design excellence. Single application containers often are not adjustable to accommodate disposable trash bags of varying dimensions.

Finally, many prior art devices fail to provide versatility for the aged or physically infirm wherein the design allows the user to apply mechanical advantage thereto in repositioning it from the refuse collecting position to the transporting position. Most prior art devices require the user to bear the full weight of the container as well as its contents.

SUMMARY OF THE INVENTION

The present invention is a lawn bagger for dead leaves, grass clippings, pine needles, and other accumulated lawn trash. In use, a plastic or paper bag is placed around the open rear of the bagger and held in place with a length of elastic or other cord. With the bag in place, the device is placed flat on the ground and the lawn trash is raked or blown directly into it. Picking the lawn bagger up by the handle and holding it upright allows the trash to drop into the bag of its own weight, or the trash may be urged into the bag by hand.

More specifically, the lawn bagger is comprised of a rigid frame structure which provides an unobstructed opening or funnel into a bag which is conveniently held over the back end by a flexible cord, such as a bungee cord, having fastening hooks located at each of its ends. The frame structure also preferably includes a bottom panel extending beyond the vertical plane of a top panel and side panels angled downwardly from the top panel to form an opening sufficiently large to permit a lawn rake or broom to guide the trash into the converging tunnel, or funnel of the lawn bagger. A handle may be provided on the top panel for convenience of lifting the lawn bagger each time the trash is emptied into the bag.

Therefore, it is an object of the present invention to provide a debris collecting and bagging apparatus and method that do not require the direct manual transfer of debris into a receptacle.

Another object of the invention is to provide a bagging apparatus of the above type that is simple in construction, inexpensive to manufacture, and highly effective in operation.

A further object of the invention is to provide a lawn bagger of the above type permitting convenient collection of lawn trash and quick attachment and easy removal of a waste-filled bag.

A still further object of the invention is to provide an improved collector and bag holder construction which has a unique configuration consisting of an extended bottom wall, a sloping top wall and side walls surrounding a rectangular discharge opening.

Other objects and advantages of the invention will be apparent from the following description taken in conjunction with the annexed drawings.

BRIEF DESCRIPTION OF THE DRAWINGS

FIG. 1 is a top view of a lawn bagger in accordance with the invention.

FIG. 2 is a front view of a lawn bagger in accordance with the invention.

FIG. 3 is a side view of a lawn bagger in accordance with the invention.

FIG. 4 is a perspective view of a lawn bagger being filled with lawn trash.

FIG. 5 is a perspective view of a lawn bagger being lifted to empty the trash into the bag.

DESCRIPTION OF THE PREFERRED EMBODIMENT

Referring to drawings FIGS. 1 through 5, a preferred embodiment of a combination of a debris collecting and bagging apparatus 10 is illustrated. Although the apparatus is principally intended for consumer or household type applications, it is contemplated that it could also be employed for many commercial or industrial applications. A specific use for the apparatus 10 contemplated by the applicant is an aid in gathering and storing refuse or items which are scattered on the ground such as grass clippings, thatch, dust, dirt, leaves, and the like.

As can be seen, the bottom side 11 lies flat and facilitates raking the trash thereonto. The apparatus 10 also includes oppositely disposed side walls 12 and top side 13, joined to the bottom side 11 to form a hollow body, apparatus 10. The sloping top side 13, is shorter than the bottom side 11 thus leaving an opening between the side walls 12 to permit the sweeping or raking of trash onto bottom side 11 as shown in FIG. 4. The bottom side 11 and top side 13 gradually decrease in transverse direction toward the back end of the lawn bagger, thus, when the apparatus 11 is assembled, it will have a broad mouth portion forward end 14 and a contracted inner portion back end 15.

A flange 16 extends outwardly from the perimeter of back end 15 as shown in FIGS. 1 and 2. The flange 16 may extend perpendicularly as shown, or at an angle as shown in dotted lines. In operation, a plastic or other bag 17 is placed over flange 16 and held in place by cord 18. The back end 15 is sized to accommodate the smallest practical sized bag such as a 20-gallon paper (biodegradable) bag, as well as to accommodate bags as large as a 39-gallon bag, or as small as a 13-gallon kitchen garbage bag. In practice, when the bag 17 is assembled with cord 18, it is possible to drag the filled bag without the bag 17 slipping off.

A carrying means, handle 19, is provided for carrying the apparatus 10 as well to provide convenient holding and lifting means when lifting the apparatus 10 to empty its contents into the bag 17. The handle 19 may be supplemented by, or replaced by, a longer handle. In a second embodiment, a "U" shaped bracket (not shown), is tack welded where the current handle 19 is located and a handle, shaped like a hairpin, with the bottom ends at a 90-degree angle is inserted into holes in the "U" shaped bracket. In practice, the apparatus 10 may also be lifted by gripping the top side 13 at its forward end.

Collecting and bagging apparatus 10 may be made from steel, galvanized steel, molded plastic or other rigid material such as aluminum. Sheet metal construction of the apparatus 10 provides sufficient weight to hold it very flat against the surface being cleaned and is equally useful for sweeping sand, dirt, and similar debris from the pavement. Apparatus 10 is far superior to a dustpan. Because of its unique shape, apparatus 10 may be manufactured using state-of-the-art processes and conveniently packaged for shipment by removing the handle 19 and stacking the units inside each other. Although the apparatus 10 is especially useful for older citizens residing in modular homes with little storage space, it would be of greatest use for raking leaves in the northern part of the United States. With the current emphasis on ecology, a paper bag or a biodegradable plastic bag 17 would be preferred.

The method of collecting and bagging leaves, trash, and other debris would comprise the steps of assembling the bag 17 to the flange 16 and fastening the bag 17 by encircling the back end 15 with the cord 18. The apparatus, with bag 17 attached is then placed on the surface to be cleaned and the debris is forced into the opening at the forward end 14. The handle 19 is then gripped, and the apparatus 10 is lifted sufficiently to drop the contents into the bag 17. Except for very light matter such as pine needles, lifting the handle usually causes everything to drop down into the bag 17, in which case, a gentle push will complete the step. The steps are then repeated until the bag 17 is filled to near capacity. The bag 17 is then removed and cinched with a line or plastic tie usually supplied with the bags.

While the invention has been explained with respect to a preferred embodiment thereof, it is contemplated that various changes may be made in the invention without departing from the spirit and scope thereof.

What is claimed is:

1. An apparatus for collecting debris and holding a bag for loading debris, comprising:
   a rigid frame structure having a front loading end and a back funnel end and having;
   a flat, bottom side, having side edges, a front end and a back end, said front end being wider than said back end,
   side walls oppositely opposed to each other, vertically affixed to said side edges of said bottom side,
   a top side affixed to said side walls opposite said bottom side, said top side sloping downwardly toward said back end of said bottom side and thereby forming a channel shape toward said funnel end,
   attachment means formed around said funnel end for temporarily attaching the open end of a removable trash bag for directly receiving debris collected on said bottom side and for passing said debris through said funnel end into said bag,
   fastening means for wrapping around said attachment means and said bag for releasably securing said trash bag to said attachment means, and
   carrying means affixed to said top side for holding and lifting said frame structure and said trash bag.

2. An apparatus as described in claim 1 wherein said top side is shorter than said bottom side thereby leaving an opening between said side walls for sweeping or raking of trash onto said bottom side.

3. An apparatus as described in claim 1 wherein said attachment means consists of a narrow flange formed on each of said top and bottom sides and said side walls.

4. An apparatus as described in claim 3 wherein said flange is formed at a 45° angle.

5. An apparatus as described in claim 1 wherein said fastening means consists of an elastic band having quick connect means thereon.

6. An apparatus for collecting debris and holding a bag for loading debris, comprising:
- a rigid frame structure having a front loading end and a back funnel end and also having;
- a flat bottom side, having side edges, a front end and a back end, said front end being wider than said back end,
- side walls oppositely opposed to each other, vertically affixed to said side edges of said bottom side,
- a top side affixed to said side walls opposite said bottom side, said top side sloping downwardly toward said back end of said bottom side and thereby forming a channel shape toward said funnel end, and said top side being shorter than said bottom side thereby leaving an opening between said side walls for sweeping or raking of trash onto said bottom side,
- flanges formed around said funnel end for temporarily attaching the open end of a removable trash bag for directly receiving debris collected on said bottom side and for passing said debris through said funnel end into said bag,
- an elastic band having quick connect means thereon for releasably securing said trash bag to said flanges, and
- a carrying handle affixed to said top side for holding and lifting said frame structure and said trash bag.

7. Apparatus as described in claim 6 wherein said flanges are formed at 45°.

* * * * *